(12) United States Patent
Mortensen et al.

(10) Patent No.: US 11,591,214 B2
(45) Date of Patent: Feb. 28, 2023

(54) PROCESS AND SYSTEM FOR PRODUCING SYNTHESIS GAS

(71) Applicant: HALDOR TOPSØE A/S, Kgs. Lyngby (DK)

(72) Inventors: Peter Mølgaard Mortensen, Roskilde (DK); Kim Aasberg-Petersen, Allerød (DK)

(73) Assignee: HALDOR TOPSØE A/S, Kgs. Lyngby (DK)

(*) Notice: Subject to any disclaimer, the term of this patent is extended or adjusted under 35 U.S.C. 154(b) by 251 days.

(21) Appl. No.: 16/753,427

(22) PCT Filed: Nov. 15, 2018

(86) PCT No.: PCT/EP2018/081407
§ 371 (c)(1),
(2) Date: Apr. 3, 2020

(87) PCT Pub. No.: WO2019/110267
PCT Pub. Date: Jun. 13, 2019

(65) Prior Publication Data
US 2020/0317514 A1 Oct. 8, 2020

(30) Foreign Application Priority Data

Dec. 8, 2017 (DK) .......................... PA 2017 00699

(51) Int. Cl.
*C01B 3/38* (2006.01)
*B01J 19/00* (2006.01)
*B01J 19/24* (2006.01)

(52) U.S. Cl.
CPC .......... *C01B 3/382* (2013.01); *B01J 19/0013* (2013.01); *B01J 19/245* (2013.01); *C01B 3/386* (2013.01);
(Continued)

(58) Field of Classification Search
CPC ......... C01B 3/382; C01B 3/386; C01B 3/388; C01B 2203/0233; C01B 2203/0244;
(Continued)

(56) References Cited

U.S. PATENT DOCUMENTS

| | | | |
|---|---|---|---|
| 4,985,230 | A | 1/1991 | Baden et al. |
| 5,102,645 | A | 4/1992 | Fisher et al. |

(Continued)

FOREIGN PATENT DOCUMENTS

| | | |
|---|---|---|
| AU | 2007242933 A1 | 1/2008 |
| CA | 2396402 A1 | 1/2004 |

(Continued)

OTHER PUBLICATIONS

Communication pursuant to Article 94(3) EPC dated Jun. 28, 2022, issued in the corresponding European Patent Application No. 18803667.7, 4 pages.

(Continued)

*Primary Examiner* — Jafar F Parsa
(74) *Attorney, Agent, or Firm* — Buchanan Ingersoll & Rooney P.C.

(57) ABSTRACT

A process for producing synthesis gas, the process including the steps of: a) in a reforming reactor, reacting a hydrocarbon feed stream together with an oxidant gas stream, thereby producing a first synthesis gas stream; b) providing a heated $CO_2$ rich gas stream to an adiabatic post converter including a second catalyst active for catalyzing steam methane reforming, methanation and reverse water gas shift reactions; and c) in the adiabatic reforming post converter, letting at least a part of the first synthesis gas stream and the heated $CO_2$ rich gas stream undergo steam methane reforming, methanation and reverse water gas shift reactions to (Continued)

thereby provide a product gas stream, the product gas stream being a synthesis gas stream. Also, a system for producing synthesis gas.

24 Claims, 3 Drawing Sheets

(52) U.S. Cl.
CPC ....... *C01B 3/388* (2013.01); *B01J 2219/0004* (2013.01); *B01J 2219/00135* (2013.01); *B01J 2219/00157* (2013.01); *C01B 2203/0233* (2013.01); *C01B 2203/0244* (2013.01); *C01B 2203/0261* (2013.01); *C01B 2203/085* (2013.01); *C01B 2203/0811* (2013.01); *C01B 2203/1241* (2013.01)

(58) Field of Classification Search
CPC ..... C01B 2203/0261; C01B 2203/0811; C01B 2203/085; C01B 2203/1241; B01J 19/0013; B01J 19/245; B01J 2219/0004; B01J 2219/00135; B01J 2219/157
See application file for complete search history.

(56) References Cited

U.S. PATENT DOCUMENTS

| | | | |
|---|---|---|---|
| 5,536,699 | A | 7/1996 | Ghelfi et al. |
| 5,958,273 | A | 9/1999 | Koch et al. |
| 6,527,980 | B1 | 3/2003 | Roden et al. |
| 9,834,440 | B2 | 12/2017 | Kern et al. |
| 2002/0081253 | A1 | 6/2002 | Abe |
| 2002/0119084 | A1 | 8/2002 | Boneberg et al. |
| 2003/0014974 | A1 | 1/2003 | Rojey et al. |
| 2003/0162846 | A1 | 8/2003 | Wang et al. |
| 2005/0054737 | A1 | 3/2005 | Lee-Tuffnell et al. |
| 2012/0025140 | A1 | 2/2012 | Tetzlaff |
| 2013/0334465 | A1 | 12/2013 | Zhao et al. |
| 2013/0345326 | A1 | 12/2013 | Bashir et al. |
| 2015/0129805 | A1 | 5/2015 | Karpenko et al. |
| 2016/0023201 | A1 | 1/2016 | Chaudret et al. |
| 2016/0318824 | A1 | 11/2016 | Steynberg et al. |
| 2017/0106360 | A1 | 4/2017 | Meriam |
| 2020/0354216 | A1 | 11/2020 | Mortensen |
| 2020/0377365 | A1 | 12/2020 | Mortensen et al. |
| 2021/0113983 | A1 | 4/2021 | Mortensen et al. |
| 2021/0171344 | A1 | 6/2021 | Mortensen et al. |
| 2021/0238035 | A1 | 8/2021 | Mortensen et al. |
| 2022/0119255 | A1 | 4/2022 | Mortensen |
| 2022/0162067 | A1 | 5/2022 | Mortensen et al. |

FOREIGN PATENT DOCUMENTS

| | | |
|---|---|---|
| CA | 2866987 A1 | 9/2013 |
| CA | 2979782 A1 | 9/2016 |
| EP | 0208929 A1 | 1/1987 |
| EP | 0396650 A1 | 11/1990 |
| EP | 0433223 A1 | 6/1991 |
| EP | 0601956 A2 | 6/1994 |
| GB | 2210286 A | 6/1989 |
| JP | 2015509905 A | 4/2015 |
| JP | 2015521578 A | 7/2015 |
| WO | 9002603 A1 | 3/1990 |
| WO | 03070629 A1 | 8/2003 |
| WO | 2013135667 A1 | 9/2013 |
| WO | 2013135699 A1 | 9/2013 |
| WO | 2013190500 A2 | 12/2013 |
| WO | 2014180888 A1 | 11/2014 |
| WO | 2015011503 A1 | 1/2015 |
| WO | 2015103592 A1 | 7/2015 |
| WO | 2015153610 A1 | 10/2015 |
| WO | 2017186608 A1 | 11/2017 |
| WO | 2017211885 A1 | 12/2017 |

OTHER PUBLICATIONS

Danish Search Report dated May 15, 2018, issued in the corresponding Danish Patent Application No. PA 2017 00697, 8 pages.
International Search Report (PCT/ISA/210) received for the PCT Application No. PCT/EP2018/081404, dated Jan. 3, 2019, 6 pages.
Written Opinion (PCT/ISA/237) received for the PCT Application No. PCT/EP2018/081404, dated Jan. 3, 2019, 8 pages.
International Search Report (PCT/ISA/210) received for the PCT Application No. PCT/EP2018/081409, dated Jan. 3, 2019, 6 pages.
Written Opinion (PCT/ISA/237) received for the PCT Application No. PCT/EP2018/081409, dated Jan. 3, 2019, 6 pages.
Danish Search Report dated Jun. 8, 2018, issued in the Danish Patent Application No. PA 2017 00700, 10 pages.
Notice of Reasons for Refusal dated Jun. 29, 2022, issued in the corresponding Japanese Patent Application No. 2020-530989, 8 pages including 4 pages of English Translation.
Mortensen, et al., "Direct Hysteresis Heating of Catalytically Active Ni—Co Nanoparticles as Steam Reforming Catalyst", Industrial & Engineering Chemistry Research, vol. 56, No. 47, Nov. 2, 2017, 2 pages.
International Search Report and Written Opinion issued in corresponding International Patent Application No. PCT/EP2018/081407, 15 pages (dated Jan. 3, 2019).
Search Report issued in corresponding Danish Patent Application No. PA 2017 00699, 11 pages (dated Jun. 8, 2018).
Aasberg-Petersen, K., et al., "Synthesis gas production for FT synthesis," Studies in Surface Science and Catalysis vol. 152, Chapter 4, p. 258-405 (2004).
Mortensen, Peter M., et al., "Industrial scale experience on steam reforming of CO2-rich gas," Elsevier, Science Direct, Applied Catalysis A: General 495, pp. 141-151 (2015).
U.S. Appl. No. 16/766,415, Peter Mølgaard Mortensen, filed May 22, 2020.
U.S. Appl. No. 16/765,356, Peter Mølgaard Mortensen, filed May 19, 2020.

PROCESS AND SYSTEM FOR PRODUCING SYNTHESIS GAS

FIELD OF THE INVENTION

Embodiments of the invention generally relate to a system and a process for producing synthesis gas. In particular, the invention relates to a system and a process aimed at producing a reformed stream with a relatively low $H_2/CO$ ratio.

BACKGROUND

Catalytic synthesis gas production by steam reforming of a hydrocarbon feed has been known for decades. The endothermic steam reforming reaction is typically carried out in a steam methane reformer (SMR). A steam reformer or steam methane reformer has a number of catalyst filled tubes placed in a furnace or fired heater to provide the heat for the endothermic reaction. The tubes are normally 10-14 meters in length and 7-15 cm in inner diameter. The heat for the endothermic reaction is supplied by combustion of fuels in burners in the furnace. The synthesis gas exit temperature from the steam reformer depends on the application of the synthesis gas but will normally be in the range from 650° C.-980° C.

It is known that carbon formation on the catalyst used in catalytic synthesis gas production by steam reforming is a challenge, especially for production of synthesis gasses with a relatively low $H_2/CO$ ratio. Therefore, catalysts resistant to carbon formation are required. Such carbon resistant catalysts are e.g. noble metal catalysts, partly passivated nickel catalysts, and promoted nickel catalysts. Moreover, industrial scale reforming of $CO_2$ rich gas typically requires a co-feed of water to decrease the severity of the gas for carbon formation. From a thermodynamic viewpoint, it is advantageous to have a high concentration of $CO_2$ and a low concentration of steam in the feed stream to promote the production of synthesis gas with a low $H_2/CO$ ratio. However, operation at such conditions may not be feasible due to the possibility of carbon formation on the catalyst.

Alternative production of a synthesis gas with a low $H_2/CO$ ratio by steam reforming is a sulfur passivated reforming (SPARG) process which may be used for producing synthesis gas with a relatively low $H_2/CO$ ratio. This process requires desulfurization of the produced synthesis gas to produce a sulphur free synthesis gas.

More details of various processes for producing synthesis gas with low $H_2/CO$-ratio can be found in "Industrial scale experience on steam reforming of $CO_2$-rich gas", P. M. Mortensen & I. Dybkjær, Applied Catalysis A: General, 495 (2015), 141-151.

The terms "reforming" and "methane reforming" are meant to denote a reforming reaction according to one or more of the following reactions:

$$CH_4+H_2O \leftrightarrow CO+3H_2 \quad (i)$$

$$CH_4+2H_2O \leftrightarrow CO_2+4H_2 \quad (ii)$$

$$CH_4+CO_2 \leftrightarrow 2CO+2H_2 \quad (iii)$$

Reactions (i) and (ii) are steam methane reforming reactions, whilst reaction (iii) is the dry methane reforming reaction.

For higher hydrocarbons, viz. $C_nH_m$, where $n \geq 2$, $m \geq 4$, equation (i) is generalized as:

$$C_nH_m+nH_2O \rightarrow nCO+(n+m/2)H_2 \quad (iv),$$

where $n \geq 2$, $m \geq 4$

Typically, reforming is accompanied by the water gas shift reaction (v):

$$CO+H_2O \leftrightarrow CO_2+H_2 \quad (v)$$

The term "steam methane reforming" is meant to cover the reactions (i) and (ii) running from the left towards the right side of the arrow, whilst the term "methanation" is meant to cover the reactions (i) and/or (ii) running from the right towards the left side of the arrow. Thus, the term "steam methane reforming/methanation reactions" is meant to denote the reactions (i) and (ii) running towards equilibrium. The term "reverse water gas shift" is meant to denote the reaction (v) running from the right towards the left side of the arrow. In most cases, all of these reactions are at, or close to, equilibrium at the outlet from the catalyst bed or catalyst zone of the reactor concerned.

Processes based on Autothermal Reforming (ATR) is an alternative route to production of synthesis gas, especially when a low ratio of hydrogen to carbon monoxide is required. The main elements of an ATR reactor are a burner, a combustion chamber, and a catalyst bed contained within a refractory lined pressure shell. In an ATR reactor, partial combustion of the hydrocarbon feed by sub-stoichiometric amounts of oxygen is followed by steam reforming of the partially combusted hydrocarbon feed stream in a fixed bed of steam reforming catalyst. Steam reforming also takes place to some extent in the combustion chamber due to the high temperature. The steam reforming reaction is accompanied by the water gas shift reaction. Typically, the gas is at or close to equilibrium at the outlet of the reactor with respect to steam reforming and water gas shift reactions. The temperature of the exit gas is typically in the range between 850 and 1100° C. More details of ATR and a full description can be found in the art such as "Studies in Surface Science and Catalysis, Vol. 152," Synthesis gas production for FT synthesis"; Chapter 4, p. 258-352, 2004".

ATR uses oxygen and steam, and optionally also carbon dioxide, in a reaction with a hydrocarbon feed stream to form synthesis gas. The ratio of hydrogen to carbon monoxide in the exit gas depends upon the selected operation conditions including the amount of steam and carbon dioxide added to the hydrocarbon feed stream and/or the ATR reactor. Increasing the amount of carbon dioxide will decrease the hydrogen to carbon monoxide ratio in the product gas, but will also increase the size of the reactor due to the higher flow.

It is an object of the invention to provide a process and system for producing synthesis gas with a predetermined $H_2/CO$ ratio. It is also an object of the invention to provide a process and system for production of synthesis gas with a low $H_2/CO$ ratio, preferably without producing excess $H_2$. It is furthermore an object of the present invention to provide a system and a process for production of a synthesis gas, where the reforming reactor is an ATR reactor and where the system and process has lower oxygen consumption and with a reduced size of the ATR reactor. It is also an object of the invention to provide a process and system providing a high CO production from a reforming plant. It is a further object of the invention to provide a process and system which are useful as a revamp of an existing process and system, in a case where it is required to change the composition of the product gas stream towards producing more carbon monoxide from an existing process and system or for increasing the carbon monoxide production capacity.

SUMMARY OF THE INVENTION

An aspect of the invention relates to a process for producing synthesis gas, the process comprising the steps of: a)

in an reforming reactor, reacting a hydrocarbon feed stream together with an oxidant gas stream, thereby producing a first synthesis gas stream; b) providing a heated $CO_2$ rich gas stream to an adiabatic post converter comprising a second catalyst active for catalyzing steam methane reforming, methanation and reverse water gas shift reactions; and c) in the adiabatic post converter, letting at least a part of the first synthesis gas stream and the heated $CO_2$ rich gas stream undergo steam methane reforming, methanation and reverse water gas shift reactions to thereby provide a product gas stream, the product gas stream being a synthesis gas stream. The $H_2/CO$ ratio of the product gas stream will be below the $H_2/CO$ ratio of the first synthesis gas stream.

By carrying out steam methane reforming, methanation and reverse water gas shift reactions in a separate reactor, viz. the adiabatic post converter, downstream the reforming reactor, the CO production of the process may be increased and/or the $H_2/CO$ ratio may be tailored.

The term "post converter" is meant to denote a reactor downstream a reforming reactor, where the steam reforming, methanation and reverse water gas shift reaction run towards equilibrium in the post converter. The synthesis gas from the reforming reactor is converted into a product synthesis gas in the post converter, the product synthesis gas having a lower $H_2/CO$ ratio than the synthesis gas from the reforming reactor. The term "reforming reactor" is meant to denote a synthesis gas generation reactor, such as i. a. a steam methane reforming reactor or an autothermal reforming reactor.

The use of an adiabatic post converter comprising a second catalyst active in catalysing steam methane reforming, methanation and reverse water gas shift reactions may seem counterintuitive, since methane is generated from the hydrogen and carbon monoxide in the first synthesis gas stream, by the reactions (i) and (iii) running towards the left side. However, the advantage of providing a synthesis gas with a high concentration of carbon monoxide whilst alleviating the risk of carbon formation on the catalyst within the adiabatic post converter outweighs the potential disadvantage of a minor increase in the amount of methane in the synthesis gas stream.

Within this context, the term S/C or "S/C ratio" is an abbreviation for the steam-to-carbon ratio. The steam-to-carbon ratio is the ratio of moles of steam to moles of carbon in hydrocarbons a gas, such as the hydrocarbon feed stream. Thus, S/C is the total number of moles of steam divided by the total number of moles of carbon from the hydrocarbons in the gas. Moreover, the term "O/C" or "O/C ratio" is an abbreviation for the atomic oxygen-to-carbon ratio. The oxygen-to-carbon ratio is the ratio of moles of oxygen to moles of carbon in a gas.

Furthermore, the term H/C or "H/C ratio" is an abbreviation for the atomic hydrogen-to-carbon ratio. The hydrogen-to-carbon ratio is the ratio of moles hydrogen to moles of carbon in a gas. It should be noted that the term "C" in the ratio S/C thus is different from the "C" in the ratios H/C and O/C, since in S/C "C" is from hydrocarbons only, whilst in O/C and H/C, "C" denotes all the carbon in the gas.

The term "synthesis gas" is meant to cover a gas comprising at least hydrogen and carbon monoxide, while it also may comprise carbon dioxide, methane and steam and possibly small amounts of other gasses, such as argon, nitrogen, etc.

It should be noted that the second catalyst in the adiabatic post converter is active for catalyzing steam methane reforming, methanation and reverse water gas shift reactions. These three reactions are closely related and the reactions run towards equilibrium in the adiabatic post converter.

In an embodiment, the reforming reactor is an ATR reactor. The ATR reactor comprises a burner, a combustion chamber, and a bed of the first catalyst housed within a refractory lined pressure shell. In another embodiment, the reforming reactor is a steam methane reforming reactor. The steam methane reforming reactor comprises a number of tubes housing the first catalyst within a furnace with burners.

In an embodiment, the product gas stream is a synthesis gas with an $H_2/CO$ ratio below 1.8. Preferably, the $H_2/CO$ ratio of the synthesis gas is i. a. below 1.6, more preferably below 1.4, even more preferably below 1.2, and most preferably below 1.0.

In an embodiment, the at least part of the first synthesis gas stream and the heated $CO_2$ rich gas stream are combined to a combined gas stream upstream the adiabatic post converter. Alternatively, the at least part of the first synthesis gas stream and the heated $CO_2$ rich gas stream are let separately into the adiabatic post converter for mixing therein. The term "$CO_2$ rich gas" is meant to denote a gas stream with a $CO_2$ content of at least 50 dry mole %, such as at least 70 dry mole % $CO_2$, such as at least 90 dry mole % $CO_2$.

In an embodiment, the heated $CO_2$ rich gas stream has a temperature of between about 500° C. and 1100° C. prior to combination with the at least part of the first synthesis gas stream and/or prior to being inlet into the adiabatic post converter. Preferably, the temperature of the heated $CO_2$ rich gas stream is above 600° C., and more preferably the temperature of the heated $CO_2$ rich gas stream is about 700° C. or above, in order to avoid too low temperatures in the adiabatic post converter. The temperature of the heated $CO_2$ rich gas stream should be sufficiently high in order to avoid carbon formation. Moreover, a high temperature of the heated $CO_2$ rich gas stream provides better selectivity towards CO and thus higher yield.

The temperature of the gasses entering the adiabatic post converter should be adjusted to avoid carbon formation on the second catalyst. The minimum temperature depends on the operating conditions but would typically be 750° C. or more preferably above 800° C. The temperature of the second catalyst in the adiabatic post converter will be below 1050° C. or even below 1000° C.

An embodiment of the invention further comprises the step of heating a $CO_2$ rich gas stream to form the heated $CO_2$ rich gas stream in a fired heater. In the case, where the reforming reactor is an ATR reactor, the fired heater for heating the $CO_2$ rich gas stream may be the fired heater used for preheating of the hydrocarbon feed stream upstream the ATR reactor. Alternatively, the fired heater for heating the $CO_2$ rich gas stream may be an additional fired heater.

An embodiment of the invention further comprises the step of heating a $CO_2$ rich gas stream to form the heated $CO_2$ rich gas stream in an electrically heated heater.

An embodiment of the invention further comprises the step of heating a $CO_2$ rich gas stream to form the heated $CO_2$ rich gas stream by heat exchange with superheated steam.

An embodiment of the invention further comprises the step of heating a $CO_2$ rich gas stream form to the heated $CO_2$ rich gas stream by heat exchange with at least part of the product gas stream exiting the adiabatic post converter.

The heating of the $CO_2$ rich gas stream may be combined so that more than one of the options of: fired heater, electrically heated heater, heat exchange with superheated steam and heat exchange with the product gas stream are used. In a case of combinations, the $CO_2$ rich gas stream is firstly heated by superheated (if heating by heat exchange with superheated steam is used), subsequently within a fired heater or electrically heated heater (if heating in a fired/electrically heated heater is used) and lastly by heat exchange with at least a part of the product gas exiting the adiabatic post converter (if such heat exchange is used).

The term "hydrocarbon feed stream" is meant to denote a feed stream comprising a hydrocarbon gas with one or more hydrocarbons, and possibly other constituents, such as $CO_2$ and/or steam. Examples of "a hydrocarbon gas" may be natural gas, town gas, or a mixture of methane and higher hydrocarbons. Typically, the hydrocarbon feed stream comprises a hydrocarbon gas stream with minor amounts of hydrogen, carbon monoxide, carbon dioxide, nitrogen, or argon, or combinations thereof, in addition to the steam and possibly carbon dioxide added to the hydrocarbon gas upstream of the reforming reactor.

Typically, the hydrocarbon gas will have undergone desulfurization to remove sulfur therein and thereby avoid deactivation of the catalysts used in the process.

Optionally, the hydrocarbon gas will together with steam also have undergone adiabatic prereforming according to reaction (iv) in a temperature range of ca. 350-550° C. to convert higher hydrocarbons as an initial step in the process normally taking place downstream the desulfurization step. This removes the risk of carbon formation from higher hydrocarbons on catalyst in the subsequent process steps.

In an embodiment, the mole ratio between carbon dioxide in the heated $CO_2$ rich gas stream and hydrocarbons in the hydrocarbon feed stream is larger than 0.1. An upper limit for the mole ratio between carbon dioxide in the heated $CO_2$ rich gas stream and hydrocarbons in the hydrocarbon feed stream is 4. Typically, the mole ratio between carbon dioxide in the heated $CO_2$ rich gas stream and hydrocarbons in the hydrocarbon feed stream is larger than 0.5.

In an embodiment, the hydrocarbon feed stream comprises steam and the S/C ratio in the hydrocarbon feed stream is between 0.2 and 2. Preferably, the S/C ratio is between 0.4 and 0.6.

In an embodiment, the amount of steam, oxygen and carbon dioxide led into the reforming reactor and the amount of steam and carbon dioxide added to the at least part of the first synthesis gas stream upstream or in the adiabatic post converter is adjusted to provide a predetermined $H_2/CO$ ratio of the product gas stream.

In an embodiment, the amount and temperature of the heated $CO_2$ rich gas stream are adjusted to ensure that the temperature of said product gas stream is at least 800° C. The temperature of said product gas stream is typically between 800° C. and 1000° C., such as e.g. 850° C.

In an embodiment, the second catalyst active is a steam reforming catalyst and/or methanation catalyst. Examples of such catalysts are $Ni/MgAl_2O_4$, $Ni/Al_2O_3$, $Ni/CaAl_2O_4$, $Ru/MgAl_2O_4$, $Rh/MgAl_2O_4$, $Ir/MgAl_2O_4$, $Mo_2C$, $Wo_2C$, $CeO_2$, a noble metal on an $Al_2O_3$ carrier, but other catalysts suitable for reforming are also conceivable. The second catalyst is thus arranged to catalyze the steam methane reforming reaction. However, since the gas inlet to the adiabatic post converter is a synthesis gas stream comprising hydrogen and carbon monoxide, both steam methane reforming, methanation and reverse water gas shift reactions all take place in the adiabatic post converter and the overall content of methane, carbon monoxide and steam outlet from the adiabatic post converter is increased.

The first catalyst is preferably also a steam methane reforming catalyst.

Another aspect of the invention relates to a system for producing synthesis gas.

The system comprises:
a reforming reactor arranged to react a hydrocarbon feed together with an oxidant gas stream thereby producing a first synthesis gas stream,
an adiabatic post converter comprising a second catalyst active for catalyzing steam methane reforming, methanation and reverse water gas shift reactions,
a conduit for leading at least part of the first synthesis gas stream into the adiabatic post converter, and where the adiabatic post converter comprises an outlet for letting out a product gas stream, the product gas stream being a synthesis gas stream, and
means for adding a heated $CO_2$ rich gas stream to the at least part of the first synthesis gas stream upstream or in the adiabatic post converter.

It should be noted that the second catalyst in the adiabatic post converter is active for catalyzing steam methane reforming/methanation reaction and reverse water gas shift reactions. These three reactions are closely related and run towards equilibrium within the post converter.

The advantages of the system and embodiments thereof correspond to those described in relation to the process of the invention. They will therefore not be described in further detail here.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
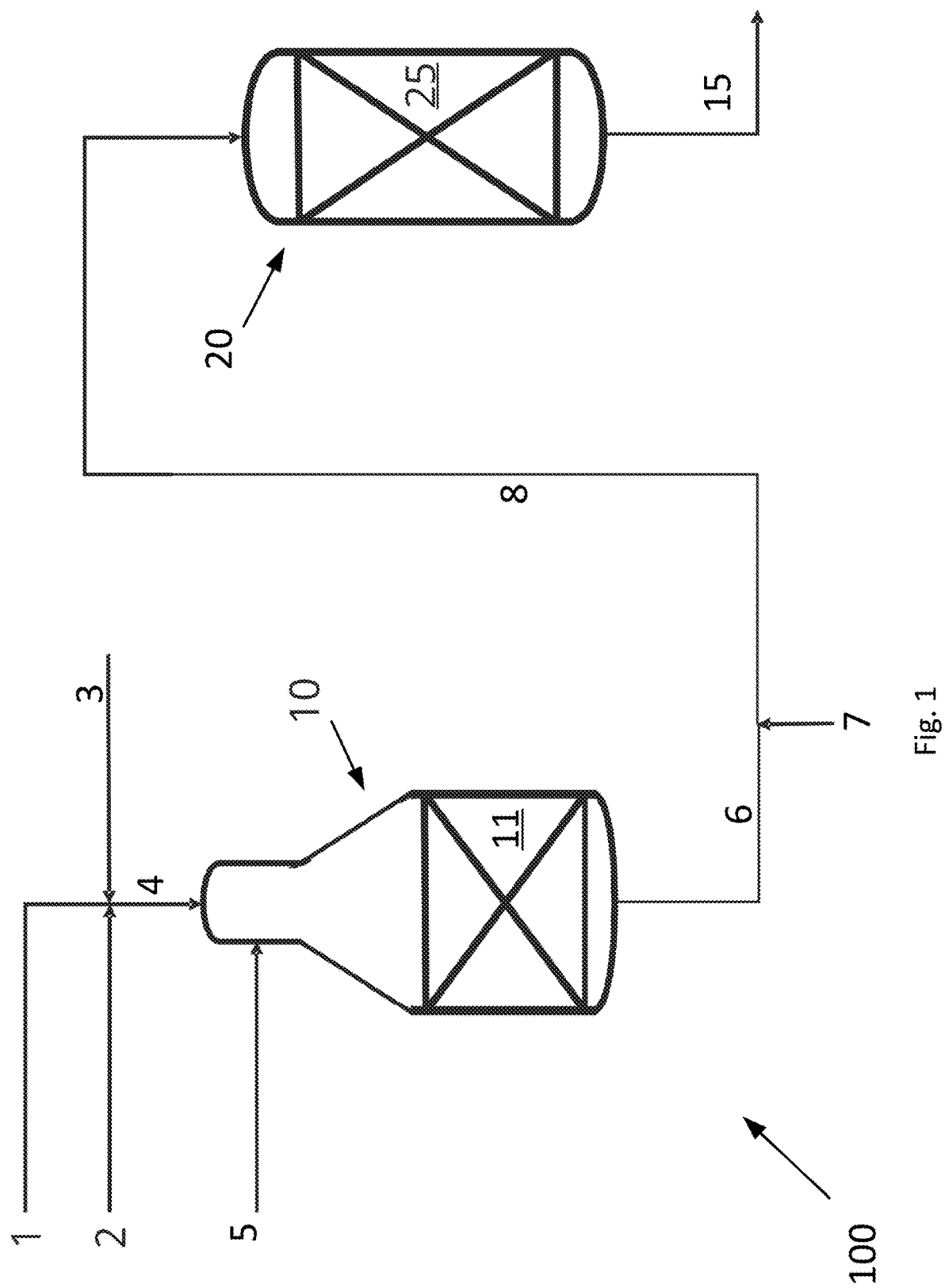
FIGS. 1 to 3 are schematic drawings of systems for producing synthesis gas according to the invention.

FIG. 1 is a schematic drawing of a system 100 for producing synthesis gas according to the invention. The system 100 comprises an ATR reactor 10 and an adiabatic post converter 20.

A hydrocarbon feed stream 4 to the ATR reactor 10 of the system 100 is made up of a stream of hydrocarbon gas 1, a $CO_2$ rich gas stream 2, for example substantially pure $CO_2$, and steam 3. The $CO_2$ rich gas stream 2 and the steam 3 are added to the hydrocarbon gas stream 1, hereby forming a combined hydrocarbon feed stream 4 prior to inletting the combined hydrocarbon feed stream 4 into the ATR reactor 10. The ATR reactor 10 houses a first catalyst 11 in the form of a steam methane reforming catalyst. An oxygen containing stream 5, such as air, an oxygen rich stream or substantially pure oxygen, is inlet into the combustion zone of the ATR reactor 10 via an inlet. The ATR reactor 10 produces a first synthesis gas stream 6 comprising hydrogen, carbon monoxide and carbon dioxide from the combined hydrocarbon feed stream 4 and the oxygen containing stream 5. The first synthesis gas stream 6 exiting the ATR reactor typically has a temperature of between about 900° C. and about 1100° C., such as about 1000° C.

The adiabatic post converter 20 houses a second catalyst 25 active in catalyzing the steam methane reforming, methanation and reverse water gas shift reactions. For example, the second catalyst 25 is a bed of second catalyst. Thus, in the adiabatic post converter 20 a net production of carbon monoxide, steam and methane takes place. Thus, the steam methane reforming reaction and reverse water gas shift reactions take place in the adiabatic post converter 20 together with the methanation reaction.

The system moreover comprises a heater (not shown in FIG. 1) for heating a $CO_2$ rich gas stream to form a heated $CO_2$ rich gas stream 7. A conduct connects the outlet from the ATR reactor 10 to the inlet to the adiabatic post converter 20. The heated $CO_2$ rich gas stream 7 is added to the first synthesis gas stream 6 upstream of the adiabatic post converter 20, thereby producing a mixed gas stream 8. This mixed gas stream 8 is inlet into the adiabatic post converter 20, and the product gas stream 15 exits the adiabatic post converter as a product synthesis gas. The product gas stream 15 may undergo further processing downstream of the adiabatic post converter 20. The product gas stream 15 is a synthesis gas.

The adiabatic post converter 20 serves to equilibrate the mixed gas and thereby to decrease the $H_2/CO$ ratio of the product gas stream 15 compared to the $H_2/CO$ ratio of the first synthesis gas stream 6.

In the embodiment shown in FIG. 1, the heated $CO_2$ rich gas stream 7 is added to the first synthesis gas stream 6 to a mixed gas stream 8 prior to being let into the adiabatic post converter 20. However, alternatively, the heated $CO_2$ rich gas stream 7 and the first synthesis gas stream 6 may be let separately into the adiabatic post converter 20 for mixing therein upstream the bed of second catalyst 25.

Figure 2:
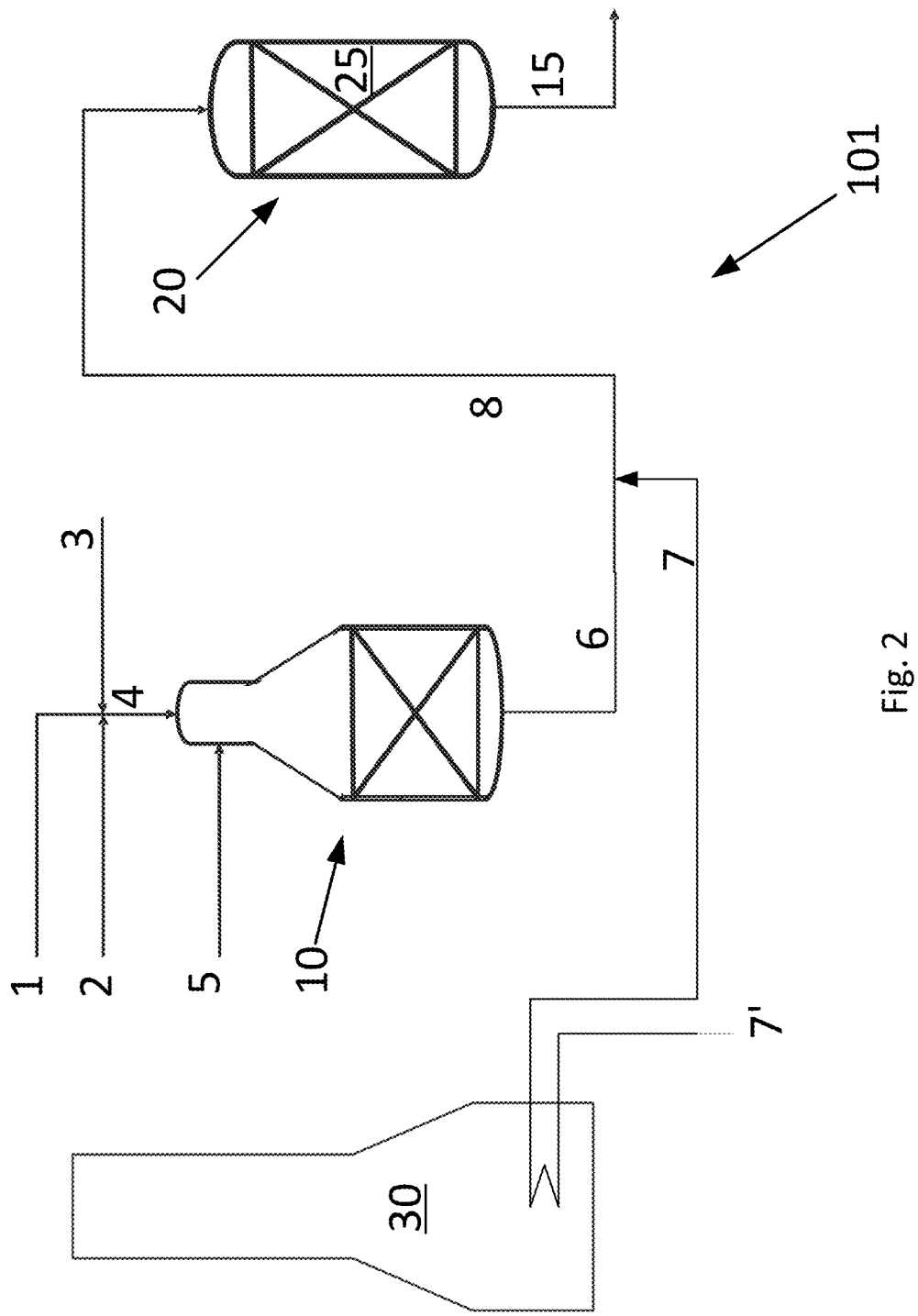

FIG. 2 is a schematic drawing of a system 101 for producing synthesis gas according to the invention. The system 101 comprises the units/components of the system 100 shown in FIG. 1. Similar units are denoted by similar reference numbers and will not be described in detail here. The system 101 comprises a heater 30. The heater 30 may be a fired heater or an electrically heated heater. The heater 30 may be a heater used for preheating of the hydrocarbon feed stream upstream the ATR reactor 10 or it may be a separate heater. A $CO_2$ rich gas stream 7' is heated by heat exchange within the heater 30, thereby rendering the heated $CO_2$ rich gas stream 7.

Figure 3:
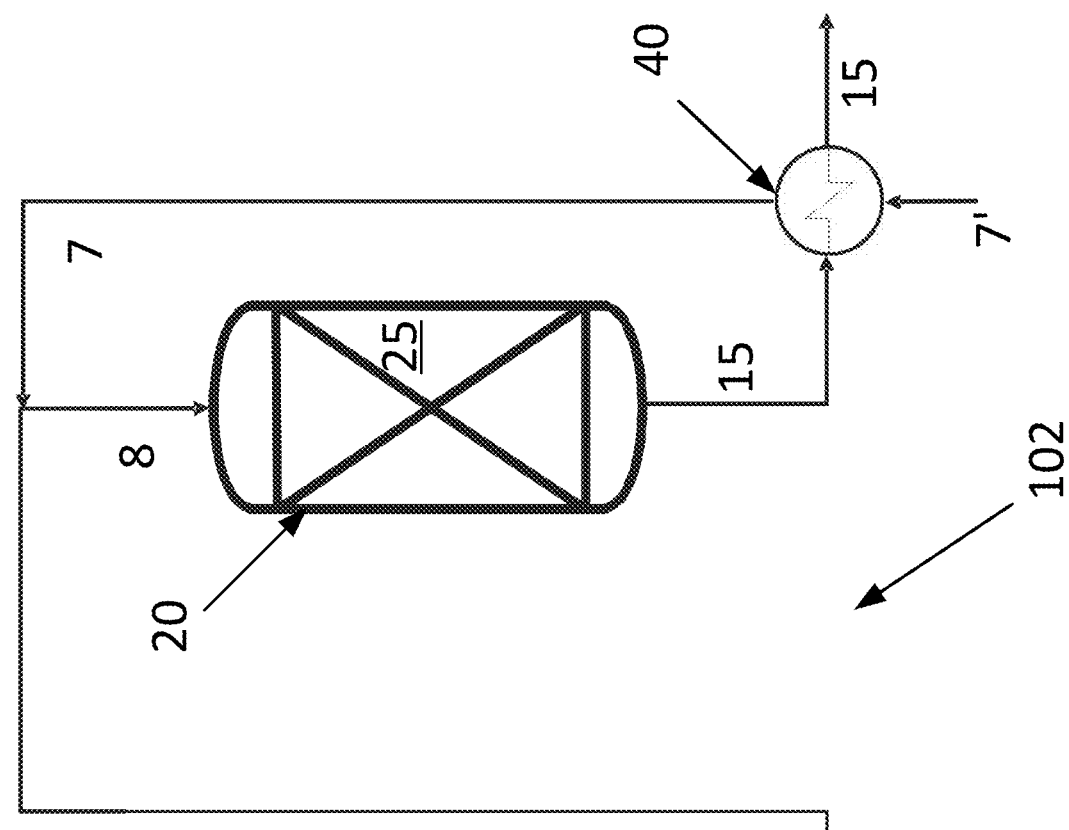
Figure 3:
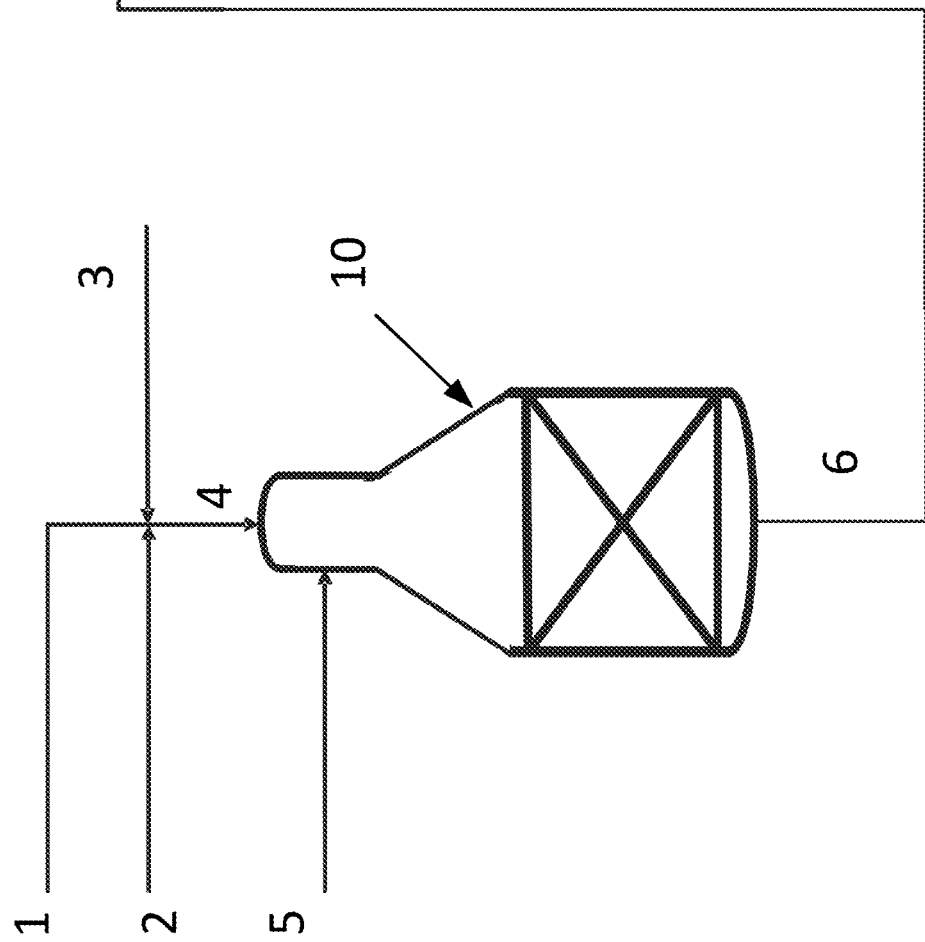

FIG. 3 is a schematic drawing of a system 102 for producing synthesis gas according to the invention. The system 102 comprises the units/components of the system 100 shown in FIG. 1. Similar units are denoted by similar reference numbers and will not be described in detail here. The system 102 comprises a heat exchanger 40 downstream the adiabatic post converter 20. A $CO_2$ rich gas stream 7' is heated by heat exchange with the hot product gas stream 15 exiting the adiabatic post converter 20, thereby rendering the heated $CO_2$ rich gas stream 7. The embodiments shown in FIGS. 2 and 3 may be combined, so that a $CO_2$ rich gas stream is initially heated by a heater 30 and subsequently heated by heat exchange with the hot product gas stream 15. Moreover, the $CO_2$ rich gas stream could be heated by heat exchange with superheated steam (not shown in the figures); in this case, the heat exchange with superheated steam would typically take place prior to the heating within a fired or electrically heated heater. A combination, wherein the $CO_2$ rich gas stream is heated firstly with superheated steam and subsequently by heat exchange with the hot product gas stream 15 from the adiabatic post converter 20 is also conceivable.

Example

An example calculation of the process is given in Table 1 below. A hydrocarbon feed stream 4 comprising a hydrocarbon gas 1, a $CO_2$ rich gas stream 2 and steam 3 and having a S/C ratio of 0.6 is fed to the ATR reactor 10 of the invention as shown in FIG. 1. The hydrocarbon feed stream 4 is heated to 650° C. prior to being let into the ATR reactor 10. The ATR reactor 10 produces a first synthesis gas stream 6. An oxygen containing stream 5 is added to the ATR reactor and the amount thereof is adjusted such that the temperature of the first synthesis gas stream 6 is 1050° C.

The total flow of all components in all inlet streams to the ATR reactor and the flow of all components in the first synthesis gas stream 6 are given in the column headed "ATR 10" in Table 1.

A $CO_2$ rich gas stream is heated to a heated $CO_2$ rich gas stream having a temperature of 650° C. and the combined gas (the first synthesis gas stream and the heated $CO_2$ gas rich stream) enters the adiabatic post converter 20 at a temperature of 969° C.

Within the adiabatic post converter 20, the combined stream is equilibrated, viz. it undergoes reverse water gas shift, methanation and reforming reactions. The overall amount of carbon monoxide, steam and methane output from the adiabatic post converter 20 is increased compared to the gas inlet to it. The exit temperature of the product gas stream exiting the adiabatic post converter 20 is 951° C., which is well below the methane decomposition equilibrium temperature for the gas of 1195° C. and above the Boudouard temperature for the gas of 850° C. Consequently, the product gas stream does not have potential for carbon formation.

In this context, the methane decomposition temperature (T(MDC)) is calculated as the temperature where the equilibrium constant of the methane decomposition into graphite ($CH_4 \leftrightarrow C+2H_2$) equals the reaction quotient of the gas. Formation of graphitic carbon can take place when the temperature is higher than this temperature. The reaction quotient QC is defined as the ratio of the square of the partial pressure of hydrogen to the partial pressure of methane, i.e. $QC = P^2_{H2}/P_{CH4}$.

The Boudouard equilibrium temperature (T(BOU)) is calculated in a similar way, but from the Boudouard reaction ($2CO \leftrightarrow C+CO_2$) and in this case formation of graphitic carbon can take place when the temperature is lower than this Boudouard equilibrium temperature.

TABLE 1

| | ATR 10 | Adiabatic post converter 20 |
|---|---|---|
| Inlet T [° C.] | 650 | 969 |
| Outlet T [° C.] | 1050 | 951 |
| Inlet P [kg/cm²g] | 35.5 | 34.5 |
| Outlet P [kg/cm²g] | 34.5 | 34 |
| Outlet T (MDC) [° C.] | — | 1195 |
| Outlet T (BOU) [° C.] | 892 | 850 |
| Inlet: | | |
| $N_2$ [Nm³/h] | 27 | 251 |
| $CO_2$ [Nm³/h] | 8515 | 19356 |

TABLE 1-continued

|  | ATR 10 | Adiabatic post converter 20 |
|---|---|---|
| $CH_4$ [$Nm^3/h$] | 19222 | 391 |
| $H_2$ [$Nm^3/h$] | 405 | 32380 |
| $H_2O$ [$Nm^3/h$] | 11639 | 17327 |
| CO [$Nm^3/h$] | 0 | 21315 |
| Oxygen feed: | | |
| $O_2$ [$Nm^3/h$] | 11018 | |
| $N_2$ [$Nm^3/h$] | 224 | |
| Oxygen feed T [° C.] | 371 | |
| Outlet: | | |
| $N_2$ [$Nm^3/h$] | 251 | 251 |
| $CO_2$ [$Nm^3/h$] | 6032 | 14597 |
| $CH_4$ [$Nm^3/h$] | 391 | 779 |
| $H_2$ [$Nm^3/h$] | 32380 | 26455 |
| $H_2O$ [$Nm^3/h$] | 17327 | 22475 |
| CO [$Nm^3/h$] | 21315 | 25685 |
| Total outlet flow [$Nm^3/h$] | 77696 | 90242 |

Thus, when the system and process of the invention are used, it is possible to provide a product gas stream in the form of a synthesis gas having a relative high amount of CO.

A comparative example of the corresponding numbers for producing a similar synthesis gas in system with an ATR reactor but without an adiabatic post converter, here denoted "a stand alone ATR reactor", is shown in Table 2. In this case, all $CO_2$ is added up-front the ATR reactor which operates at a S/C of 0.6.

A comparison of the examples of Table 1 and 2 shows that more oxygen is needed in the stand alone ATR reactor for production of a given amount of carbon monoxide.

From Table 1 and Table 2, it is also seen that the outlet flow from the ATR reactor in the case of the present invention is smaller than with a stand alone ATR reactor. This means that a smaller ATR reactor can be designed in the case of the invention. This also means that in case of revamps, the production of carbon monoxide can be boosted without the need for enlarging a given ATR reactor. This is done by adding the adiabatic post converter according to the invention.

TABLE 2

|  | Stand alone ATR |
|---|---|
| Inlet T [° C.] | 650 |
| Outlet T [° C.] | 1050 |
| Inlet P [$kg/cm^2 g$] | 35.5 |
| Outlet P [$kg/cm^2 g$] | 34.5 |
| Outlet T (MDC) [° C.] | — |
| Inlet: | |
| $N_2$ [$Nm^3/h$] | 26 |
| $CO_2$ [$Nm^3/h$] | 18678 |
| $CH_4$ [$Nm^3/h$] | 18967 |
| $H_2$ [$Nm^3/h$] | 400 |
| $H_2O$ [$Nm^3/h$] | 11494 |
| CO [$Nm^3/h$] | 0 |
| Oxygen feed: | |
| $O_2$ [$Nm^3/h$] | 11739 |
| $N_2$ [$Nm^3/h$] | 240 |
| Oxygen feed T [° C.] | 371 |
| Outlet: | |
| $N_2$ [$Nm^3/h$] | 266 |
| $CO_2$ [$Nm^3/h$] | 11807 |
| $CH_4$ [$Nm^3/h$] | 153 |
| $H_2$ [$Nm^3/h$] | 26493 |

TABLE 2-continued

|  | Stand alone ATR |
|---|---|
| $H_2O$ [$Nm^3/h$] | 23029 |
| CO [$Nm^3/h$] | 25685 |
| Total outlet flow [$Nm^3/h$] | 87433 |

Numbers of another example of the invention is given in Table 3. A hydrocarbon feed stream comprising a hydrocarbon gas, $CO_2$ and steam, and having a S/C ratio of 0.6 is fed to the ATR reactor 10 in the system of the invention as shown in FIG. 1. This hydrocarbon feed stream is heated to 650° C. prior to being let into the ATR reactor 10. Within the ATR reactor 10, partial combustion of the hydrocarbon feed stream by sub-stoichiometric amounts of oxygen added to the ATR reactor 10 is followed by steam reforming of the partially combusted hydrocarbon feed stream in a fixed bed of a first catalyst in the form of steam reforming catalyst, thereby producing a first synthesis gas stream having a temperature of 1050° C. Due to the low $CH_4$ content of the synthesis gas from the ATR reactor, the equilibrium temperature of the methane decomposition reaction to graphitic carbon for the given gas composition is very high. At the same time this temperature is above the equilibrium temperature of the Boudouard reaction to graphitic carbon of 884° C., and consequently this gas does not have affinity for carbon formation.

A $CO_2$ rich gas stream is heated to a heated $CO_2$ rich gas stream having a temperature of 650° C. and the combined gas (the first synthesis gas stream and the heated $CO_2$ rich gas stream) enters the adiabatic post converter 20 at a temperature of 879° C.

Within the adiabatic post converter 20, the combined stream is equilibrated, viz. it undergoes reverse water gas shift, methanation and reforming reactions, with a net production of methane, steam and carbon monoxide as a result. The exit temperature of the product gas stream exiting the adiabatic post converter 20 is 856° C., which is well below the methane decomposition equilibrium temperature for the gas of 991° C. and above the Boudouard temperature for the gas of 795° C., Consequently, the product gas stream does not have potential for carbon formation. The product gas from the adiabatic post converter 20 has a $H_2/CO$ ratio of 0.63.

TABLE 3

|  | ATR 10 | Adiabatic post converter 20 |
|---|---|---|
| Inlet T [° C.] | 650 | 879 |
| Outlet T [° C.] | 1050 | 856 |
| Inlet P [$kg/cm^2 g$] | 35.5 | 34.5 |
| Outlet P [$kg/cm^2 g$] | 34.5 | 34 |
| Outlet T (MDC) [° C.] | — | 991 |
| Outlet T (BOU) [° C.] | 884 | 795 |
| Inlet: | | |
| $N_2$ [$Nm^3/h$] | 19 | 186 |
| $CO_2$ [$Nm^3/h$] | 8237 | 35439 |
| $CH_4$ [$Nm^3/h$] | 13950 | 218 |
| $H_2$ [$Nm^3/h$] | 294 | 22321 |
| $H_2O$ [$Nm^3/h$] | 8449 | 13886 |
| CO [$Nm^3/h$] | 0 | 16530 |
| Oxygen feed: | | |
| O2 [$Nm^3/h$] | 8186 | |
| N2 [$Nm^3/h$] | 167 | |
| Oxygen feed T [° C.] | 371 | |

TABLE 3-continued

|  | ATR 10 | Adiabatic post converter 20 |
|---|---|---|
| Outlet: | | |
| $N_2$ [$Nm^3/h$] | 186 | 186 |
| $CO_2$ [$Nm^3/h$] | 5439 | 28985 |
| $CH_4$ [$Nm^3/h$] | 218 | 779 |
| $H_2$ [$Nm^3/h$] | 22321 | 14186 |
| $H_2O$ [$Nm^3/h$] | 13886 | 20900 |
| CO [$Nm^3/h$] | 16530 | 22423 |
| $O_2$ [$Nm^3/h$] | 0 | 0 |

The invention claimed is:

1. A process for producing synthesis gas, said process comprising the steps of:
   a) in a reforming reactor comprising a first catalyst, reacting a hydrocarbon feed stream together with an oxidant gas stream, thereby producing a first synthesis gas stream;
   b) providing a heated $CO_2$ rich gas stream to an adiabatic post converter comprising a second catalyst active for catalyzing steam methane reforming, methanation and reverse water gas shift reactions; and
   c) in said adiabatic post converter, letting at least a part of the first synthesis gas stream and said heated $CO_2$ rich gas stream undergo steam methane reforming, methanation and reverse water gas shift reactions to thereby provide a product gas stream, said product gas stream being a synthesis gas stream.

2. The process according to claim 1, wherein the reforming reactor is an autothermal reforming reactor.

3. The process according to claim 1, wherein the reforming reactor is a steam methane reforming reactor.

4. The process according to claim 1, wherein the product gas stream is a synthesis gas stream with an $H_2/CO$ ratio below 1.8.

5. The process according to claim 1, wherein said at least part of the first synthesis gas stream and said heated $CO_2$ rich gas stream are combined to a combined gas stream upstream the adiabatic post converter.

6. The process according to claim 1, wherein the heated $CO_2$ rich gas stream has a temperature of between about 500° C. and 1100° C. prior to combination with said at least part of the first synthesis gas stream and/or prior to being inlet into said adiabatic post converter.

7. The process according to claim 1, further comprising the step of heating a $CO_2$ rich gas stream to form said heated $CO_2$ rich gas stream in a fired heater.

8. The process according to claim 1, further comprising the step of heating a $CO_2$ rich gas stream to form said heated $CO_2$ rich gas stream in an electrically heated heater.

9. The process according to claim 1, further comprising the step of heating a $CO_2$ rich gas stream to form said heated $CO_2$ rich gas stream by heat exchange with superheated steam.

10. The process according to claim 1, further comprising the step of heating a $CO_2$ rich gas stream to said heated $CO_2$ rich gas stream by heat exchange with at least part of the product gas stream exiting the adiabatic post converter.

11. The process according to claim 1, wherein the mole ratio between carbon dioxide in said heated $CO_2$ rich gas stream and hydrocarbons in the hydrocarbon feed stream is larger than 0.1.

12. The process according to claim 1, wherein said hydrocarbon feed stream comprises steam and the S/C ratio in said hydrocarbon feed stream is between 0.2 and 2.

13. The process according to claim 2, wherein the amount of steam, oxygen and carbon dioxide led into the reforming reactor and/or added to said at least part of the first synthesis gas stream upstream or in said adiabatic post converter is adjusted to provide a predetermined $H_2/CO$ ratio of said product gas stream.

14. The process according to claim 1, wherein the amount and temperature of the heated $CO_2$ rich gas stream are adjusted to ensure that the temperature of said product gas stream is at least 800° C.

15. The process according to claim 1, wherein the second catalyst is a steam reforming catalyst.

16. A system for producing synthesis gas, said system comprising:
   a reforming reactor comprising a first catalyst and being arranged to at least partially react a hydrocarbon feed together with an oxidant gas stream thereby producing a first synthesis gas stream,
   an adiabatic post converter comprising a second catalyst active for catalyzing steam methane reforming, methanation and reverse water gas shift reactions,
   a conduit for leading at least part of the first synthesis gas stream into said adiabatic post converter,
   means for adding a heated $CO_2$ rich gas stream to said at least part of the first synthesis gas stream upstream or in said adiabatic post converter; and
   an outlet from said adiabatic post converter for letting out a product gas stream, said product gas stream being a synthesis gas stream.

17. The system according to claim 16, wherein the reforming reactor is an autothermal reforming reactor.

18. The system according to claim 16, wherein the reforming reactor is a steam methane reforming reactor.

19. The system according to claim 16, wherein the product gas stream is a synthesis gas stream with an $H_2/CO$ ratio below 1.8.

20. The system according to claim 16, further comprising a fired heater, wherein said means for adding a heated $CO_2$ rich gas stream comprises means for heating a $CO_2$ rich gas stream by heat exchange within the fired heater.

21. The system according to claim 16, further comprising an electrically heated heater, wherein said means for adding a heated $CO_2$ rich gas stream comprises a means for heating a $CO_2$ rich gas stream by heat exchange within the electrically heated heater.

22. The system according to claim 16, further comprising a second heat exchange unit allowing heating a $CO_2$ rich gas stream by heat exchange with superheated steam.

23. The system according to claim 16, further comprising a third heat exchange unit allowing heating a $CO_2$ rich gas stream to said heated $CO_2$ rich gas stream by heat exchange with at least part of the product gas stream exiting said adiabatic post converter.

24. The system according to claim 16, wherein the second catalyst is a steam reforming catalyst.

* * * * *